UNITED STATES PATENT OFFICE.

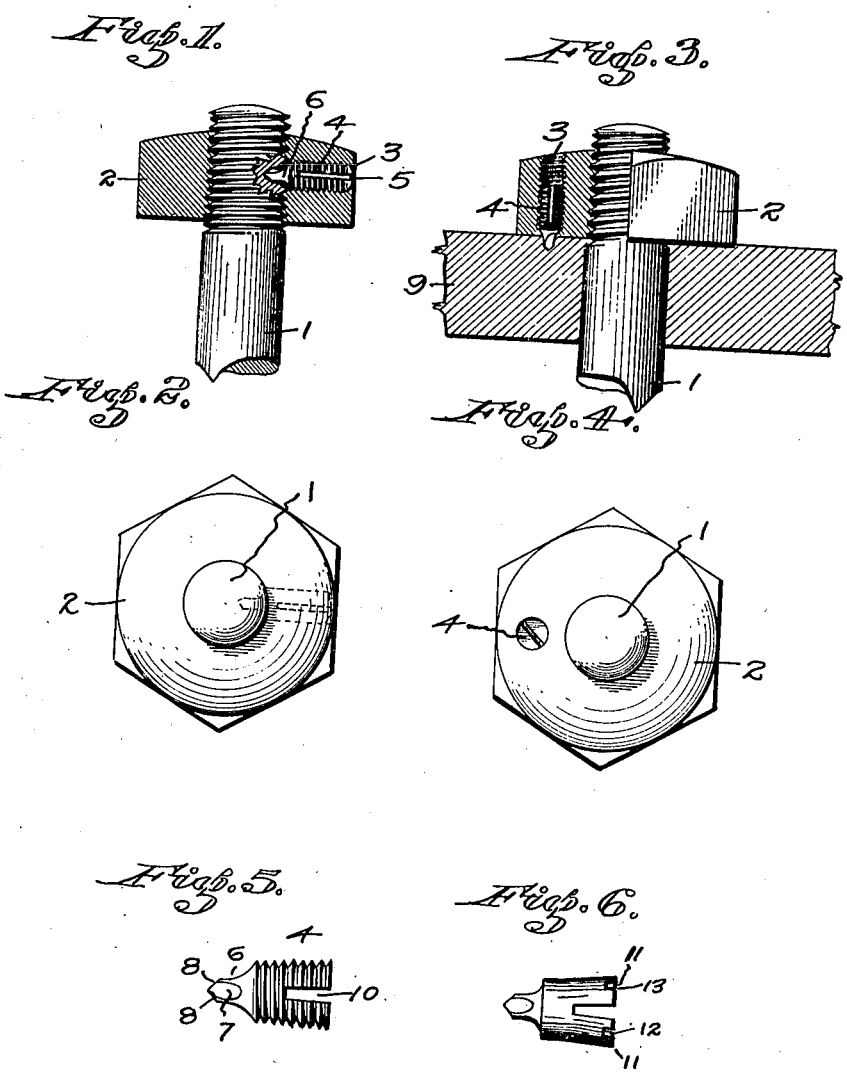

ELLEF S. CLARK, OF MARSHALL, CALIFORNIA.

NUT-LOCK.

1,292,707.          Specification of Letters Patent.     Patented Jan. 28, 1919.

Application filed December 20, 1917.  Serial No. 208,003.

*To all whom it may concern:*

Be it known that I, ELLEF S. CLARK, a citizen of the United States, and a resident of Marshall, county of Marin, State of California, have made a new and useful invention—to wit, Improvements in Nut-Locks; and I do hereby declare the following to be a full, clear, concise, and exact description of the same.

The invention relates particularly to means combined with the nut to positively engage the bolt on which the nut is screwed or the body of the object against the surface of which the nut bears, with the objects of preventing the nut from unscrewing from the bolt until the locking member is disengaged therefrom.

In this specification and the annexed drawings, the invention is illustrated in the form considered to be the best, but it is to be understood that the invention is not limited to such form because it may be embodied in other forms, and it is also to be understood that in and by the claims following the description it is desired to cover the invention in whatever form it may be embodied.

In the accompanying one sheet of drawings:

Figure 1 is a nut and bolt assemblage shown partially in cross section to disclose the interrelation of parts.

Fig. 2 is a plan view from above of the same.

Fig. 3 is a view similar to Fig. 1, illustrating a modification of the invention.

Fig. 4 is a plan view from above of the same.

Fig. 5 is a detail view of the locking element.

Fig. 6 is a similar view of a modification of the same.

In detail the construction illustrated in the drawings includes the bolt 1, threaded in accordance with general practice. The nut is internally threaded and screwed onto the bolt in the usual manner. The nut may be of any of the conventional types with regard to shape and dimensions, except that it is provided with a transverse threaded or smooth-bored hole extending from the central opening to the outer surface as at 3, Fig. 1, to receive the locking member.

The locking member consists of the threaded screw 4 slotted as at 5 to receive a screw driver bit for screwing it into the nut. The inner end is preferably slightly reduced in diameter as at 6, Fig. 5, and fluted on opposite sides as at 7, and pointed and backed off to form cutting edges as at 8, in accordance with the practice of forming metal drills. It is the function of the drill point to bore its way into the bolt as shown in Fig. 1, or the body of the material 9, against which the nut is forced (Fig. 3). This is best accomplished if the threads on the lock 4 are of finer pitch, whereby the lock is advanced slowly so as not to crowd the cutting point 8 so rapidly as to cause it to cut too coarse a chip and impede its progress to the breaking point.

In the assembly views 1 and 3, the lock is shown applied parallel with or transversely to the axis of the bolt. It is obvious, however, that it may be duplicated or applied obliquely or tangentially thereto, or in other positions contemplated within the purview of this invention, it seems unnecessary to illustrate, such modifications being obvious to those skilled in the art.

In the modification of the lock illustrated in Fig. 5, the screw driver slot 10 is carried well into the length of the lock, the diameter of which is slightly increased in the process of manufacture by gradually spreading the slot 10, whereby the slotted portion of the lock exerts a lateral spring pressure against the side of the opening 3 when it is screwed therein, the increased friction due to this tension tending to securely fasten the lock within the opening 3 when driven in the desired depth.

A further modification of the same idea is illustrated in Fig. 6, in which the screw threads are entirely omitted, in the interests of economical production. In this construction the removal of the lock is practically impossible, because the edges 11—11 during rotation cut a concentric groove in the walls of the hole 3, which effectively and positively locks the device within the hole. The extra slots 12—12 provide grips for forceps or a special tool to compress the end for removal of the lock.

This invention is operated substantially as follows: The nut is screwed onto the bolt until the desired tension against the material 9 is attained. The lock 4 is then screwed forward, the drill point cutting its way into the bolt 1 as in Fig. 1, or into the material as at Fig. 3, remaining embedded therein to form a positive lock against rotation of the nut, whereby the nut remains in position on the bolt and maintains the desired tension, the advantages of which are manifest. If it is desired to remove the nut 2, the lock 4 is backed out until the drill point clears the bolt or the object into which it has bored its way is cleared, when the nut is then free to rotate and back off the thread of the bolt. This operation can be repeated a number of times until the drilling of the point 6 endangers the strength of the bolt 1, should the nut not be restored to the same position. In instances of this kind, the modification shown in Fig. 3 is preferred in which the tensile strength of the bolt is not diminished by repeated application of the lock 4. To accomplish greater permanence, the outer lips of the hole in the nut can be mashed inwardly by hammering to imprison the nut lock against withdrawal.

Having thus described my invention, what I claim and desire to protect by Letters Patent is:

1. A nut lock consisting of a drill point having an enlargement adapted to engage a hole in a nut and having a slotted end spread to greater diameter than the rest of said enlargement.

2. In combination with a nut, a nut lock consisting of a drill point having a threaded enlargement engaging a hole in said nut, and having a slotted end whereby said drill point can be rotated beyond the surface of said nut, said slotted end being spread normally to greater diameter than said enlargement.

In testimony whereof, I have hereunto set my hand at San Francisco, California, this 16th day of November 1917.

ELLEF S. CLARK.

In presence of—
BALDWIN VALE,
LINCOLN V. JOHNSON.